United States Patent

(12) United States Patent  
Nakano et al.

(10) Patent No.: US 6,561,941 B2  
(45) Date of Patent: May 13, 2003

(54) INFINITE SPEED RATIO TRANSMISSION

(75) Inventors: Masaki Nakano, Yokohama (JP);  
Hiroyuki Hirano, Kanagawa (JP);  
Hirofumi Shimizu, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/887,061

(22) Filed: Jun. 25, 2001

(65) Prior Publication Data

US 2002/0002095 A1 Jan. 3, 2002

(30) Foreign Application Priority Data

Jun. 28, 2000 (JP) .......................... 2000-194536

(51) Int. Cl.$^7$ .......................... F16H 37/02; F16H 15/38
(52) U.S. Cl. .................. 475/214; 475/216; 476/29; 476/33; 476/42
(58) Field of Search .................. 475/214, 216, 475/219; 476/29, 33, 42

(56) References Cited

U.S. PATENT DOCUMENTS

| | | | |
|---|---|---|---|
| 4,449,423 A | * 5/1984 | Carriere | 475/205 |
| 5,178,027 A | * 1/1993 | Kobayashi et al. | 475/59 |
| 5,401,221 A | * 3/1995 | Fellows et al. | 475/214 |
| 5,667,456 A | * 9/1997 | Fellows | 475/214 |
| 6,258,003 B1 | * 7/2001 | Hirano et al. | 475/216 |
| 6,302,819 B1 | * 10/2001 | Yamada et al. | 475/214 |

FOREIGN PATENT DOCUMENTS

| | | | | |
|---|---|---|---|---|
| JP | 10-325459 | 12/1998 | | |
| JP | 11-159544 | 6/1999 | | |
| JP | 2000120830 | * 4/2000 | ......... | F16H/37/02 |

* cited by examiner

Primary Examiner—Sherry Estremsky  
Assistant Examiner—Tisha D. Lewis  
(74) Attorney, Agent, or Firm—Foley & Lardner

(57) ABSTRACT

In an infinite speed ratio transmission a fixed speed ratio transmission (130) outputting the rotation of a first shaft (310A, 310B) at a fixed speed ratio to a first gear (132) on a second shaft (320), and a continuously variable transmission (100) outputting the rotation of the first shaft (310A, 310B) at an arbitrary speed ratio to a second gear (142) fixed to the second shaft (320) are provided. Further, a planetary gear set (120) comprising a sun gear (120S), planet carrier (120C) and a ring gear (120R) is disposed between the first gear (132) and second gear (142), and a final output gear (3) is disposed between the planetary gear set (120) and second gear (142). The sun gear (120S) is joined to the second gear (142), the planet carrier (120C) is joined to the first gear (132) and the ring gear (120R) is joined to the final output gear (3). With this arrangement, the infinite speed ratio transmission can be made compact.

7 Claims, 12 Drawing Sheets

INFINITE SPEED RATIO TRANSMISSION

FIELD OF THE INVENTION

This invention relates to an infinite speed ratio transmission device which can hold an output rotation relative to an input rotation to zero by combining a continuously variable transmission, a fixed speed ratio transmission and a planetary gear set.

BACKGROUND OF THE INVENTION

Tokkai Hei 10-325459 published by the Japanese Patent Office in 1997 discloses an infinite speed ratio transmission combining a toroidal continuously variable transmission (toroidal CVT), fixed speed ratio transmission and planetary gear set.

The infinite speed ratio transmission comprises a first shaft and a second shaft parallel thereto. The first shaft is joined to the engine, and the toroidal CVT is arranged around the first shaft as center. The rotation of the first shaft is output separately through a fixed speed ratio transmission and the toroidal CVT.

A first gear which rotates according to the rotation output of the fixed speed ratio transmission and a second gear which rotates according to the rotation output of the toroidal CVT are provided on the second shaft. A power recirculation clutch, planetary gear set, direct clutch and final output gear are further arranged on the second shaft. The first gear is joined to a planet carrier of the planetary gear set via the power recirculation clutch. The second gear is fixed to a sun gear of the planetary gear set. It is also joined to the second shaft via the direct clutch. A ring gear of the planetary gear set is fixed to the second shaft. The power recirculation clutch and direct clutch are selectively engaged.

In a power recirculation mode where the power recirculation clutch is engaged while the direct clutch is disengaged, the planetary gear set varies the rotation direction and speed of the final output gear according to the difference in the rotation speed of the first gear and the second gear. The reason why the transmission is referred to as an infinite speed ratio is because the output rotation can be held at zero, i.e., the rotation of the final output gear can be stopped, while the rotation input continues.

SUMMARY OF THE INVENTION

In this infinite speed ratio transmission, the second gear is provided between the first gear and the final output gear. In other words, the gears are arranged in the order of the first gear, the second gear, and the final output gear on the second shaft.

Here, the axial position of the first gear and the second gear is determined depending on the positioning of the fixed speed ratio transmission and the toroidal CVT, and the distance between the gears cannot be set arbitrarily. In this infinite speed ratio transmission, as the final output gear is situated outside the inter-gear distance, the axial length of the second shaft required for positioning the gears is long.

In this infinite speed ratio transmission, the planetary gear set and power recirculation clutch are disposed between the first gear and second gear, and the direct clutch is disposed between the second gear and the final output gear. Here, a sun gear of the planetary gear set is joined to the second gear, and the planet carrier is joined to the first gear. A ring gear and the final output gear are fixed on the second shaft. As a result of this arrangement, the join parts of the planet carrier and first gear overlap outside the join parts of the ring gear and second shaft, so the dimensions of the planetary gear set increase in the radial direction.

Due to this reason, both the length and outer diameter of this prior art infinite speed ratio transmission is large.

It is therefore an object of this invention to reduce the dimensions of an infinite speed ratio transmission.

In order to achieve the above object, this invention provides an infinite speed ratio transmission comprising a first shaft connected to an engine, a second shaft disposed in parallel with the first shaft, a fixed speed ratio transmission comprising a first rotating element supported free to rotate on the second shaft, a continuously variable transmission comprising a second rotating element fixed to the second shaft, a planetary gear set disposed between the first rotating element and the second rotating element on the second shaft, a final output member, a first clutch and a second clutch.

The first rotating element is arranged to output a rotation of the first shaft at a fixed speed ratio and the second rotating element is arranged to output the rotation of the first shaft at an arbitrary speed ratio.

The planetary gear set comprises a sun gear joined to the second rotating element, a planet carrier joined to the first rotating element, and a ring gear which varies rotation direction and rotation speed according to a difference of a rotation speed of the sun gear and a rotation speed of the planet carrier.

The final output member is joined to the ring gear and is disposed between the planetary gear set and the second rotating element, The first clutch has a function to disengage a join of the first rotating element and the planet carrier, and the second clutch has a function to join the first rotating element and the final output member.

The details as well as other features and advantages of this invention are set forth in the remainder of the specification and are shown in the accompanying drawings.

DESCRIPTION OF THE PREFERRED EMBODIMENTS

Figure 1:
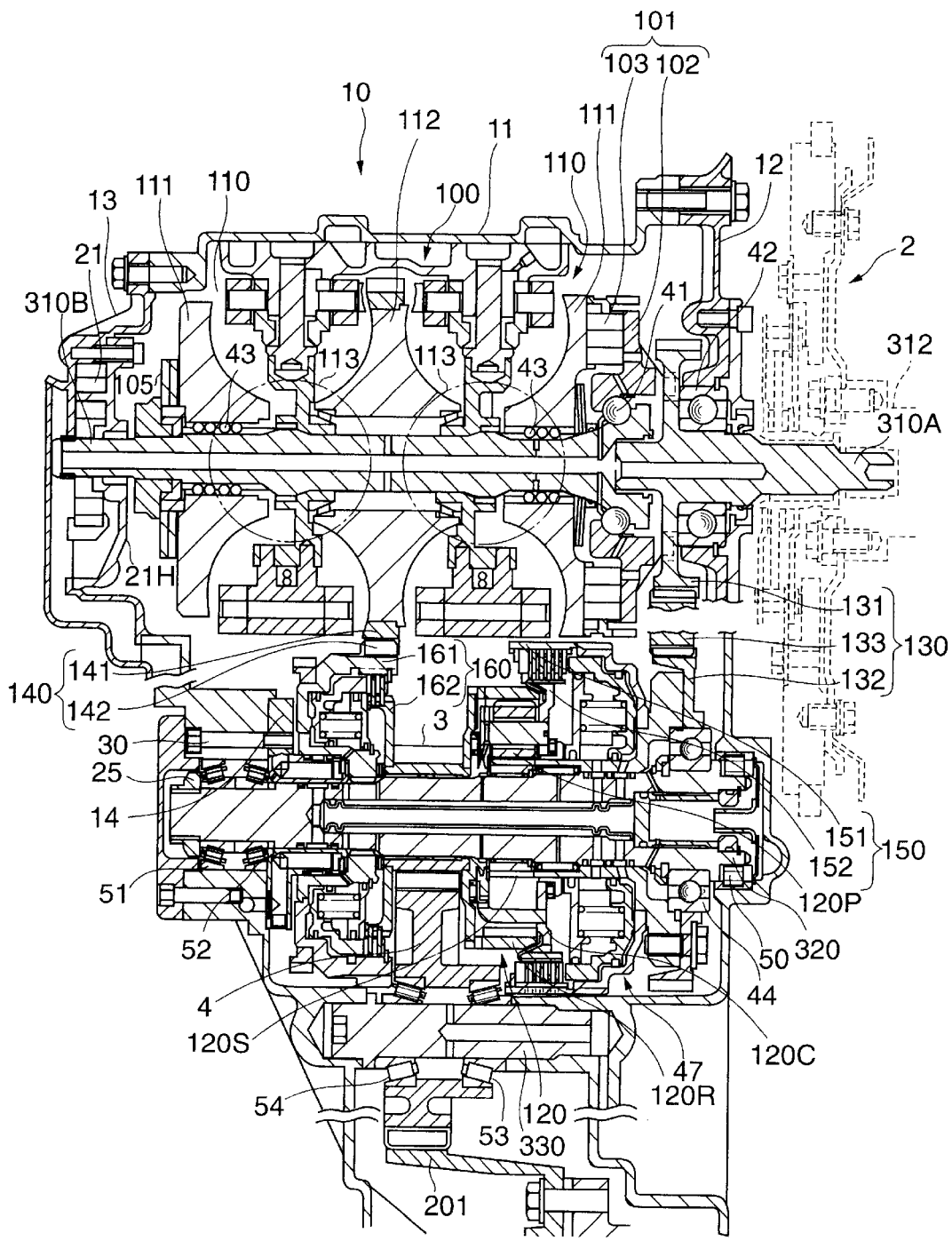
FIG. 1 is a longitudinal sectional view of an infinite speed ratio transmission according to this invention.

Referring to FIG. 1 of the drawings, an infinite speed ratio transmission is housed in a transmission case 10.

The transmission case 10 comprises a case body 11, and a front end lid 12 and rear end lid 13 which respectively seal a front opening and rear opening.

Figure 2:
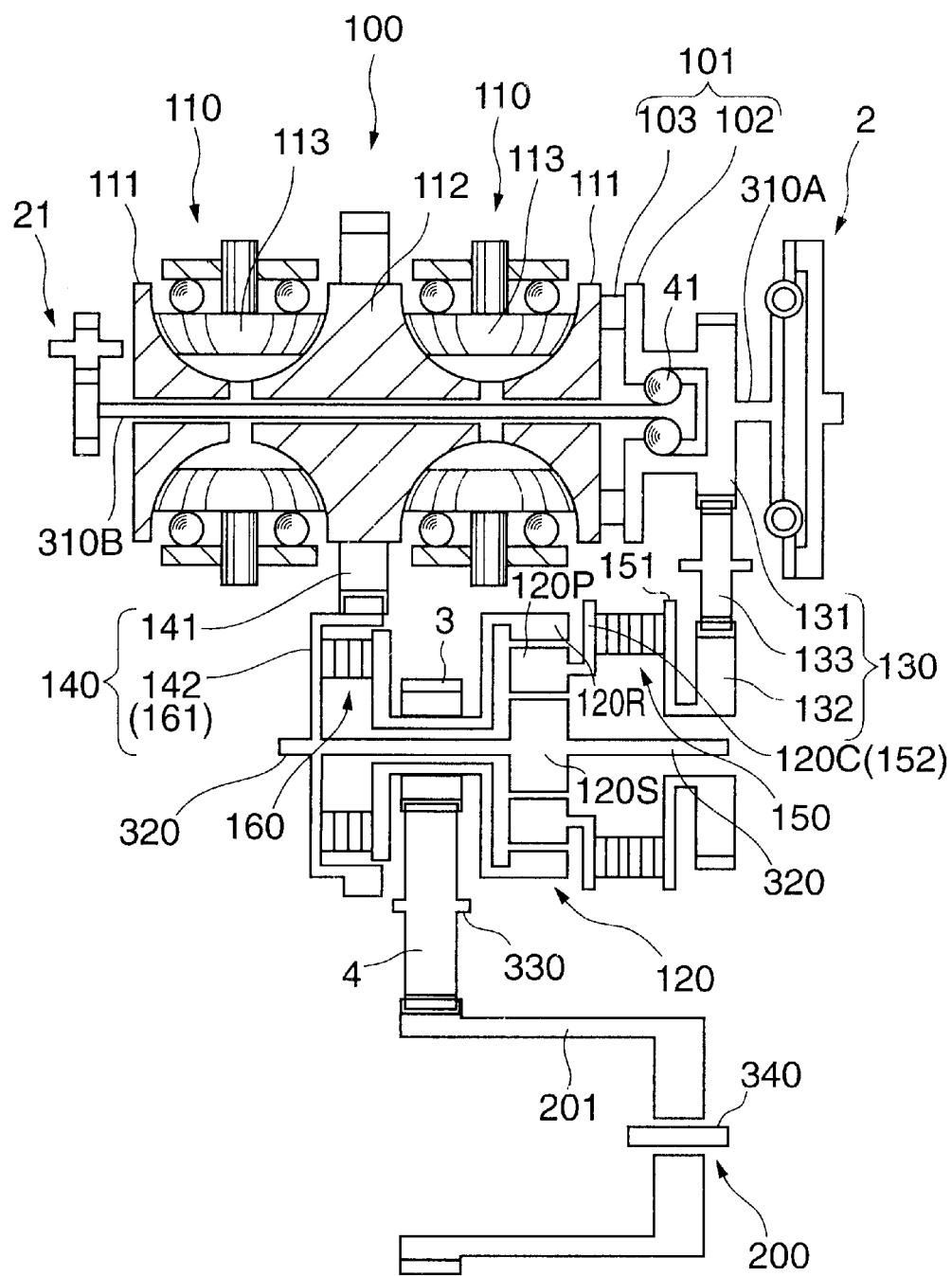
FIG. 2 is a schematic diagram of the infinite speed ratio transmission.

In the transmission case 10, a front shaft 310A, rear shaft 310B, second shaft 320, idler shaft 330 and a drive shaft 340 which is shown in FIG. 2 are arranged in parallel. The front shaft 310A and rear shaft 310B are joined on the same axle via a ball bearing 41. The front shaft 310A, which is supported in the transmission case 10 by a radial bearing 42, extends outside the transmission case 10. A crankshaft 312 of an engine of a vehicle is joined to the protruding end of the front shaft 310A via a damper 2 which absorbs rotation vibration.

An input gear 131 of a reduction gear set 130 which is a fixed speed ratio transmission is formed in one piece with the front shaft 310A. A toroidal continuously variable transmission (toroidal CVT) 100 is disposed around the rear shaft 310B.

The toroidal CVT100 is that disclosed in the aforesaid Tokkai Hei 10-325459, and comprises two toroidal transmission units 110. Each unit 110 comprises an input disk 111 and an output disk 112.

A pair of power rollers 113 are gripped between the input disk 111 and output disk 112 and transmit a rotational torque from one disk to the other disk under a speed ratio according to a gyration angle thereof.

The input disks 111 of the two toroidal conduction units 110 are respectively attached to the rear shaft 310B via the ball splines 43, and rotate together with the rear shaft 310B. Each input disk 111 can displace relative to the rear shaft 310B within a small range in the axial direction. The output disk 112 is supported free to rotate on the rear shaft 310B.

Due to a loading cam 101 which converts the rotation of the front shaft 310A into an axial force, the input disk 111 which is situated on the right-hand side of FIG. 1 is pressed toward the left of the figure. The loading cam 101 comprises a drive disk 102 which rotates together with the front shaft 310A, and cam rollers 103 disposed between the drive disk 102 and the rear surface of the input disk 111. The cam rollers 103 are elliptical cams, and press the input disk 111 by a cam surface to the left of the figure due to a relative rotating force acting between the drive disk 102 and input disk 111.

On the other hand, the input disk 111 on the left-hand side of the figure is supported by the rear shaft 310B via a spring 105. Consequently, the two sets of input disks 111 and output disks 112 exert a gripping pressure on the power rollers 113 due to the rotation of the front shaft 310A or rear shaft 310B. Eventually, the front shaft 310A and rear shaft 310B always rotate together due to the pressing force which the cam roller 103 exerts on the drive disk 102 and input disk 111. Since the front shaft 310A and rear shaft 310B are coaxial and always rotate together, they can be considered virtually as a single shaft. Therefore, herein, the front shaft 310A and rear shaft 310B will be referred to generally as a first shaft.

An oil pump 21 which is driven by the rotation of the rear shaft 310B, is attached to the end of the rear shaft 310B. The oil pump 21 is housed in a space formed by a wall 21H inside the rear end lid 13. The output disks 112 are joined together and substantially form a single disk having two toroidal surfaces each of which faces the input disk 111. A CVT output gear 141 is fixed to the outer periphery of this disk.

When the front shaft 310A is rotated by the engine, the input gear 131 of the reduction gear set 130 rotates together, and the CVT output gear 141 rotates under a speed ratio according to the gyration angle of the power rollers 113.

These two types of rotation output are respectively transmitted to a gear 132 and a gear 142 both of which are disposed on the second shaft 320 as a first rotation element and a second rotation element.

The CVT output gear 141 meshes with the gear 142. The gear 141 and gear 142 comprise a CVT output transfer device 140 of the toroidal CVT100. The input gear 131 transmits a rotation to the gear 132 via an intermediate gear 133 to change the rotation direction. The gears 131, 132, and 133 comprise the reduction gear set 130.

The second shaft 320 is supported in the transmission case 10 by a roller bearing 50 and tapered roller bearings 51, 52. The inner race of the tapered roller bearings 51, 52 is tightened on the second shaft 320 by a nut 25.

A power recirculation clutch 150, a planetary gear set 120, a final output gear 3 and a direct clutch 160 are also arranged on the second shaft 320.

Figure 3:
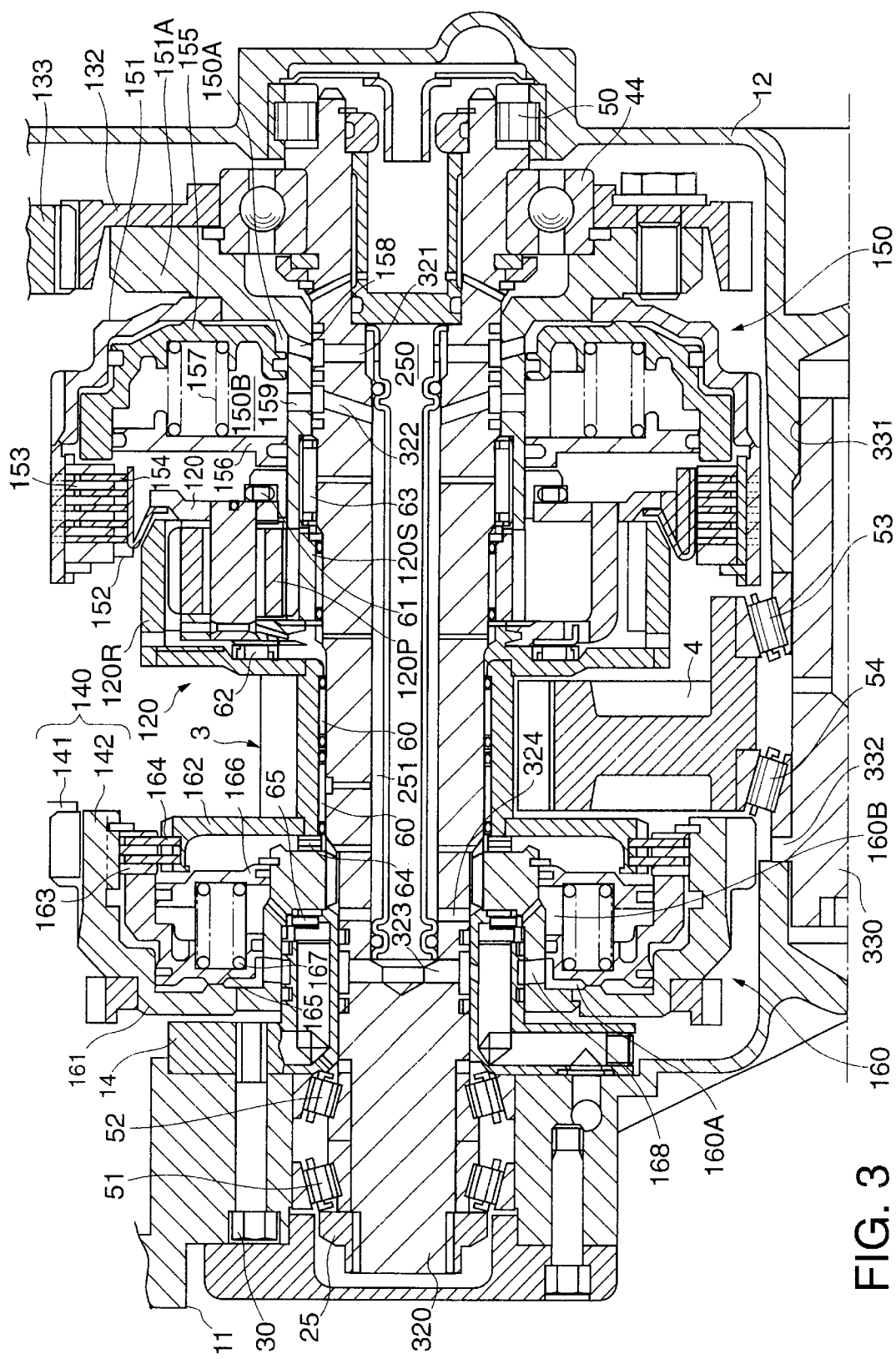
FIG. 3 is an enlarged view of the essential parts of FIG. 1.

Next, referring to FIG. 3, the power recirculation clutch 150 is a multiplate type friction clutch which comprises plural clutch plates 153, 154 between a clutch drum 151 and a clutch hub 152, these elements transmitting a rotation to each other between the clutch drum 151 and clutch hub 152 when engaged, while it allows relative rotation therebetween when disengaged. The gear 132 is supported free to rotate on the second shaft 320 via a radial bearing 44, and is fixed to the clutch drum 151 via an intermediate member 151A. The intermediate member 151A is supported on the outer circumference of the second shaft 320 by a needle bearing 63. A clutch piston 155 is arranged between the clutch drum 151 and clutch hub 152.

The clutch piston 155 is elastically supported by a spring 157 on a supporting member 156 fixed to the second shaft 320. The spring 157 pushes the clutch piston 155 in a direction which separates clutch plates 153, 154. An oil chamber 150A is formed between the clutch piston 155 and clutch drum 151, and an oil chamber 150B is formed between the clutch piston 155 and the supporting member 156. The oil chamber 150A communicates with a high pressure chamber 250 formed in the center of the second shaft 320 via an oil passage 321 and a hole 158 of the intermediate member 151A. The oil chamber 150B communicates with a low pressure chamber 251 formed outside of the high pressure chamber 250 via an oil passage 322 and a hole 159 of the intermediate member 151A. The low pressure chamber 251 is always filled with a low pressure oil that is used for the lubrication of needle bearings 60–65. By providing high pressure oil to the high pressure chamber 250 via a passage 323, the oil chamber 150A is pressurized, the clutch piston 155 presses the clutch plate 153 on the clutch plate 154 against the spring 157, and a rotation is thereby transmitted between the clutch drum 151 and clutch hub 152 due to the friction between the clutch plates.

On the other hand, if the high pressure in the high pressure chamber 250 is released to a drain, the clutch piston 155 which was pushed by the spring 157 separates the clutch plate 153 from the clutch plate 154, and disengages the power recirculation clutch 150.

The planetary gear set 120 comprises a sun gear 120S, ring gear 120R, plural planet gears 120P, and a planet carrier 120C which supports the planet gears 120P and moves around the second shaft 320. The planet gears 120P are disposed between the sun gear 120S and ring gear 120R, and mesh with both gears. The planet carrier 120C is fixed to the clutch hub 152 of the power recirculation clutch 150. The sun gear 120S is fixed to the second shaft 320. The ring gear 120R is fixed to the final output gear 3 and is also connected to a clutch hub 162 of the direct clutch 160 via the final output gear 3. The planet carrier 120C rotates relative to the intermediate member 151A via a thrust bearing 61.

The final output gear 3 is arranged between the planetary gear set 120 and the direct clutch 160, and is free to rotate on the outer circumference of the second shaft 320 via a needle bearings 60.

The final output gear 3 and planet carrier 120C rotate relative to each other via a needle thrust bearing 62.

The final output gear 3 meshes with an idler gear 4 supported on the idler shaft 330 via tapered roller bearings 53, 54.

Referring to FIGS. 1 and 2, the idler gear 4 meshes with a ring gear 201 of a differential 200.

In the differential 200, the rotation of the ring gear 201 is separated into a drive force of the left and right drive wheels, and output to the left and right drive wheels via the drive shaft 340. A flange 332 is formed at an end of the idler shaft 330.

Referring again to FIG. 3, the end of the third shaft 330 penetrates the hole part formed in the case body 11 of the transmission case 10 such that the flange 332 comes in contact with the case body 11 around the hole part. A screw part 331 is formed at the other end of the third shaft 330. The screw part 331 is screwed into a hole formed in the front end lid 12.

The clutch hub 162 of the direct clutch 160 is fixed to a side face of the final output gear 3. The direct clutch 160 comprises plural clutch plates 163, 164 between a clutch drum 161 and the clutch hub 162. The gear 142 of the CVT output transfer device 140 is formed on the outer circumference of the clutch drum 161.

The clutch drum 161 is spline jointed to the second shaft 320, and always rotates together with the sun gear 120S via the second shaft 320. A needle thrust bearing 64 is interposed between the clutch drum 161 and the side face of the final output gear 3.

A support 14 fixed by a bolt 30 on the case body 11 supports the clutch drum 161 via a needle thrust bearing 65.

A clutch piston 165 is provided between the clutch drum 161 and clutch hub 162.

The clutch piston 165 is elastically supported by a spring 167 on a supporting member 166 fixed to the second shaft 320. The spring 167 pushes the clutch piston 165 in a direction tending to separate the clutch plates 163, 164. An oil chamber 160A is formed between the clutch piston 165 and clutch drum 161, and an oil chamber 160B is formed between the clutch piston 165 and supporting member 166.

The oil chamber 160A is provided with high pressure oil via a passage 168 which is connected to a high pressure supply port, not shown. It should be noted that the oil supply passage to the oil chamber 160A and the oil supply passage to the oil chamber 150A are formed separately so as not to simultaneously engage the power recirculation clutch 150 and the direct clutch 160. The oil chamber 160B communicates with the low pressure chamber 251 via an oil passage 324. With this construction, the oil chambers 160B and 150B are kept at the same low pressure. By pressurizing the oil chamber 160A via the passage 168, therefore, the clutch piston 165 presses the clutch plate 163 on the clutch plate 164 via the spring 167, and transmits rotation between the clutch drum 161 and clutch drum 162 due to the frictional force between the clutch plates. On the other hand, if the high pressure in the oil chamber 160A is released to the drain, the clutch piston 165 which was pushed by the spring 167 separates the clutch plate 163 from the clutch plate 164, and disengages the direct clutch 160.

In the continuously variable transmission, power can be transmitted in two modes, i.e., a power recirculation mode wherein the power recirculation clutch 150 is engaged and the direct clutch 160 is disengaged, and the direct mode wherein the power recirculation clutch 150 is disengaged and the direct clutch 160 is engaged. Specifically, in the power recirculation mode, the planetary gear set 120 outputs a rotation to the final output gear 3 according to the difference between the output rotation of the reduction gear set 130 and the output rotation of the toroidal CVT 100. In the direct mode, the output rotation of the toroidal CVT 100 is directly output to the final output gear 3.

The gear 132, power recirculation clutch 150, planetary gear set 120 final output gear 3, direct clutch 160 and gear 142 are disposed in this order from the right of FIG. 3 in the second shaft 320. The gear 142 is joined to the sun gear 120S via the second shaft 320.

The planetary gear set 120 and final output gear 3 are disposed between the gear 132 which outputs the rotation of the reduction gear set 130 and the gear 142 which outputs the rotation of the toroidal CVT 100. The positions of the gears 132, 142 are determined according to the position of the input gear 131 and CVT output gear 141 on the first shaft. If the final output gear were disposed at the end of the second shaft 320 as in the prior art, the dimensions of the second shaft 320 in the axial direction would become large.

In this continuously variable transmission, however, the planetary gear set 120 and final output shaft 3 are disposed between the gear 132 and gear 142, so the length of the second shaft 320 in the axial direction can be shortened. The second shaft 320 which is shortened in the axial direction has a smaller twisting amount during operations, so the load on the radial bearing 44 and tapered roller bearings 51, 52 which support the second shaft 320 is mitigated.

Further, by disposing the reduction gear set 130 between the damper 2 and the toroidal CVT 100, compared to an infinite speed ratio transmission wherein the reduction gear set was disposed at the end of the first shaft as in the prior art, the second shaft 320 may be shifted in the direction of the damper 2. Specifically, in FIG. 1, the outer shape of the infinite speed ratio transmission slopes towards the right of the figure below the end of the rear shaft 310B. This shape is desirable to suppress the space required to install the infinite speed ratio transmission.

In FIG. 3, the planet carrier 120C is joined to the clutch hub 152 situated on the right-hand side, and the ring gear 120R is joined to the final output gear 3 situated on the left-hand side. Therefore, unlike the case of the aforesaid prior art, the planet carrier 120C does not overlap with the ring gear 120C, and the dimensions of the infinite speed ratio transmission in the radial direction can be reduced.

Figure 4:
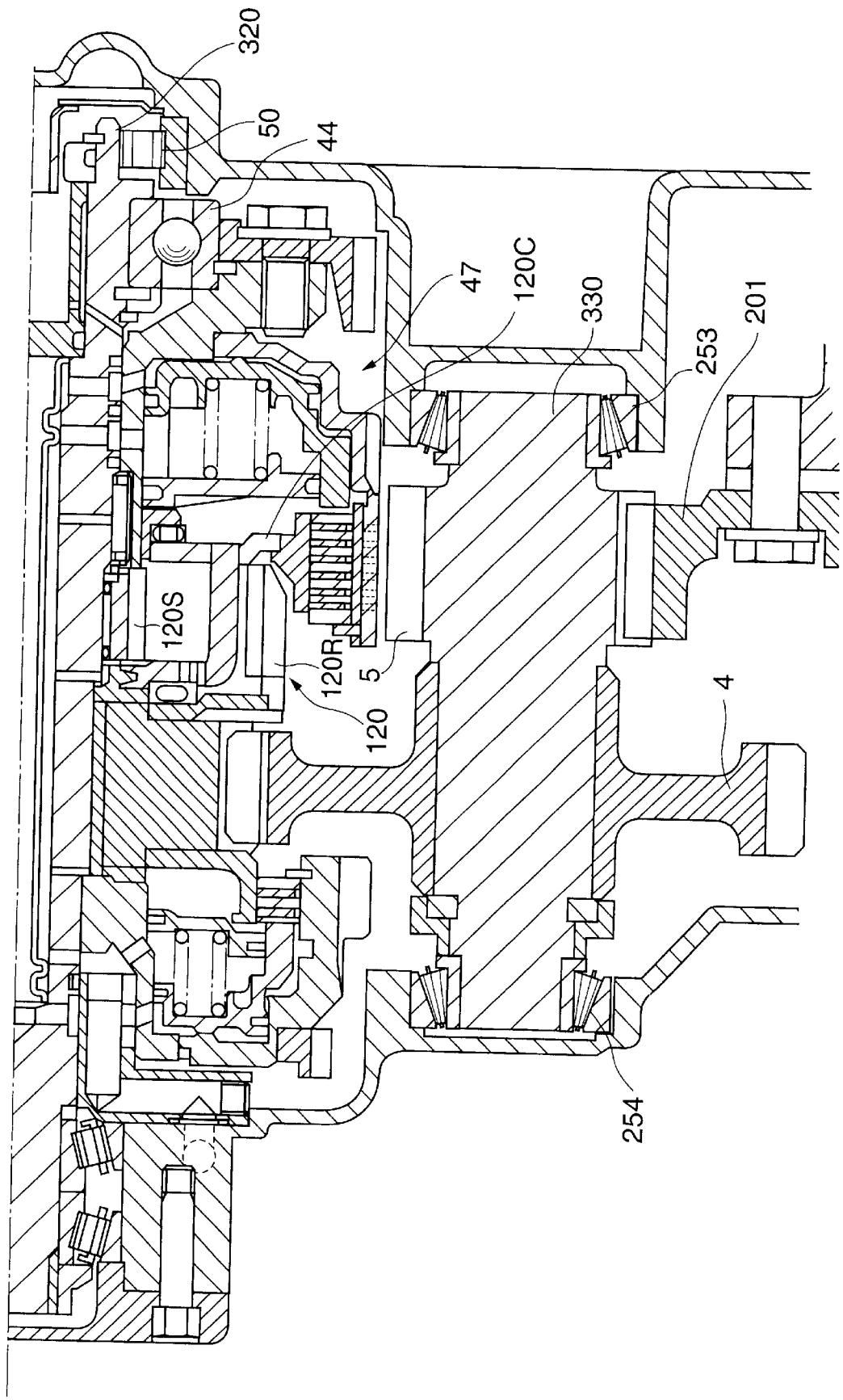
FIG. 4 is an enlarged longitudinal sectional view of the essential parts of an infinite speed ratio transmission according to a second embodiment of this invention.
Figure 5:
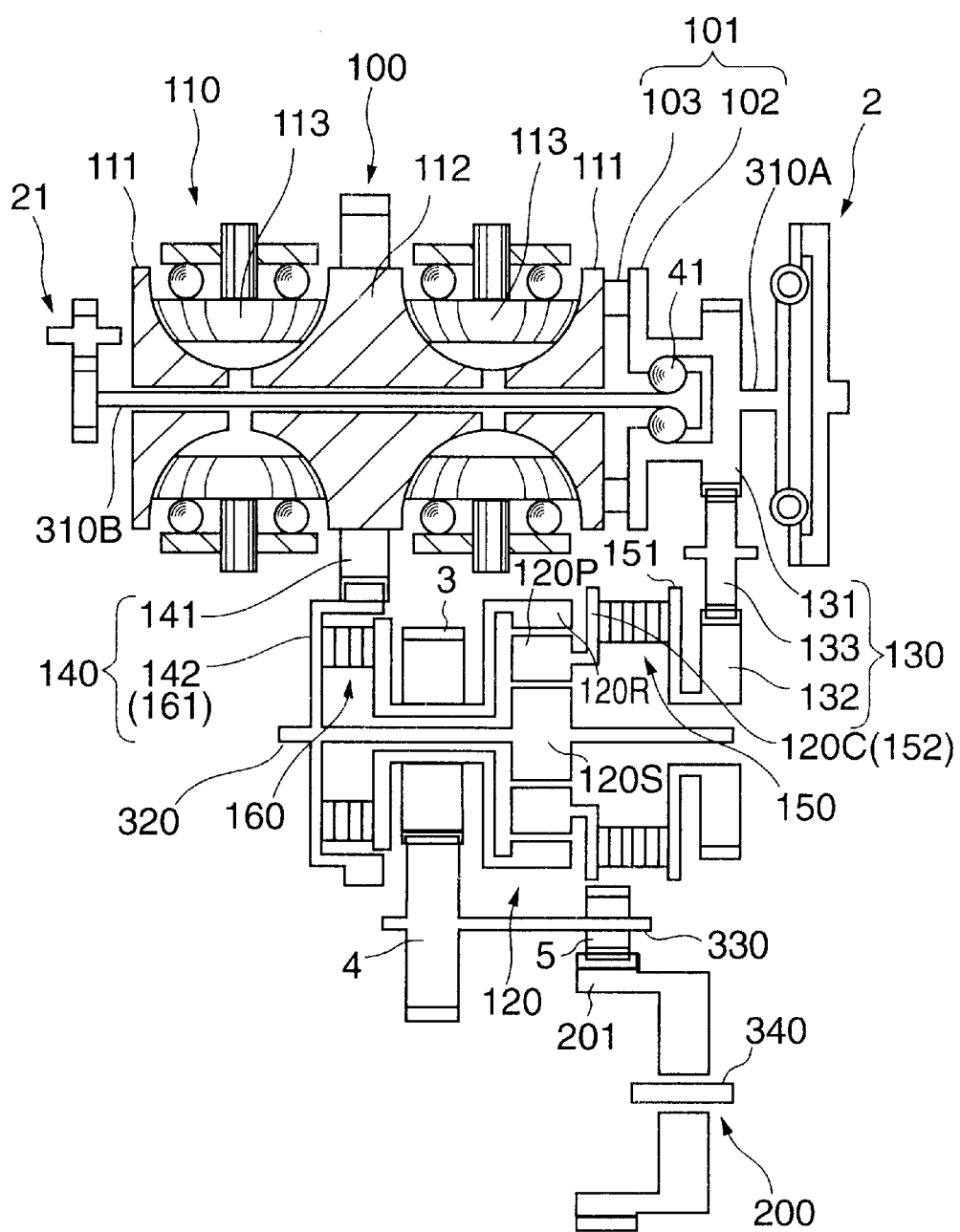
FIG. 5 is a schematic diagram of the infinite speed ratio transmission device according to the second embodiment of this invention.

Next, a second embodiment of this invention will be described referring to FIGS. 4 and 5.

In this embodiment, the structure of the idler gear 4 is different. Specifically, the idler gear 4 is fixed to the idler shaft 330, and the idler shaft 330 is supported free to rotate in the transmission case 10 by tapered bearings 253, 254. Further, an output gear 5 of smaller radius than the idler gear 4 is fixed to the idler shaft 330. The output gear 5 meshes with the ring gear 201 of the differential 200. The remaining features of the construction are identical to those of the first embodiment.

According to this embodiment, due to the difference in the radii of the idler gear 4 and output gear 5, the output rotation of the infinite speed ratio transmission is reduced, so the radius of the ring gear 201 of the differential 200 can be reduced. A desirable gear ratio for the idler gear 4 and output gear 5 is 1–1.5.

Figure 6:
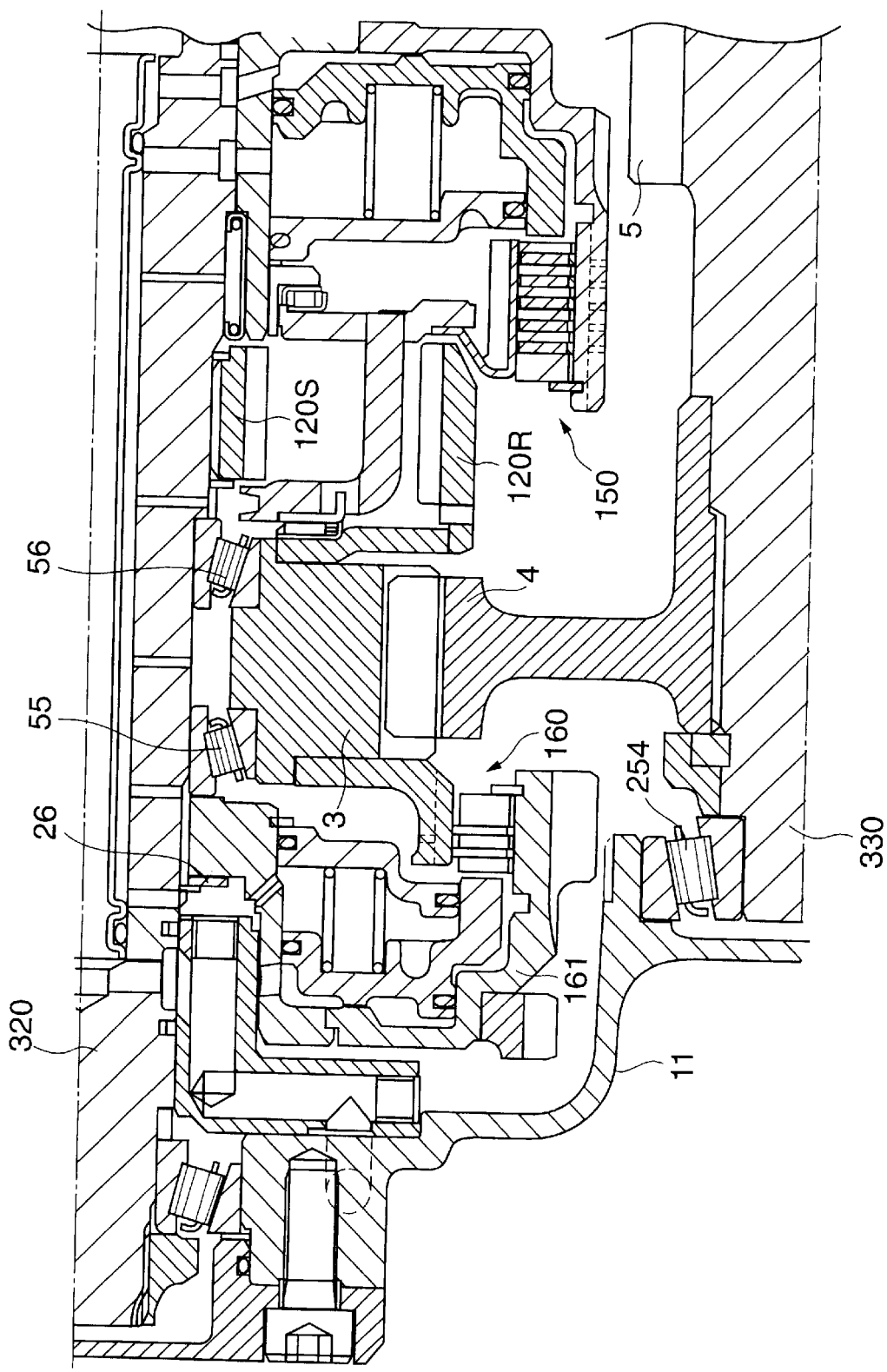
FIG. 6 is similar to FIG. 3, but showing a third embodiment of this invention.

Next, a third embodiment of this invention will be described referring to FIG. 6. According to this embodiment, the final output gear 3 is supported on the second shaft 320. The tapered roller bearings 55, 56 are positioned apart from each other so that the effective span relating to the load support of the tapered roller bearings 55, 56 is larger than the width of the teeth of the final output gear 3 in the axial direction. The tapered roller bearings 55, 56, arranged with a large interval in the axial direction in this way, provide a larger supporting force relative to the displacement of the final output gear 3 in the falling direction than the needle bearing 60. The increase of supporting force relative to the load in the falling direction can also be improved using angular ball bearings instead of the tapered roller bearings 55, 56.

In this embodiment, the clutch drum 161 of the direct clutch 160 is elastically supported in the axial direction by a plate spring 26. The plate spring 26 exerts a preload on the tapered roller bearings 55, 56 via the clutch drum 161. The remaining features of the construction are identical to those of the second embodiment.

Figure 7:
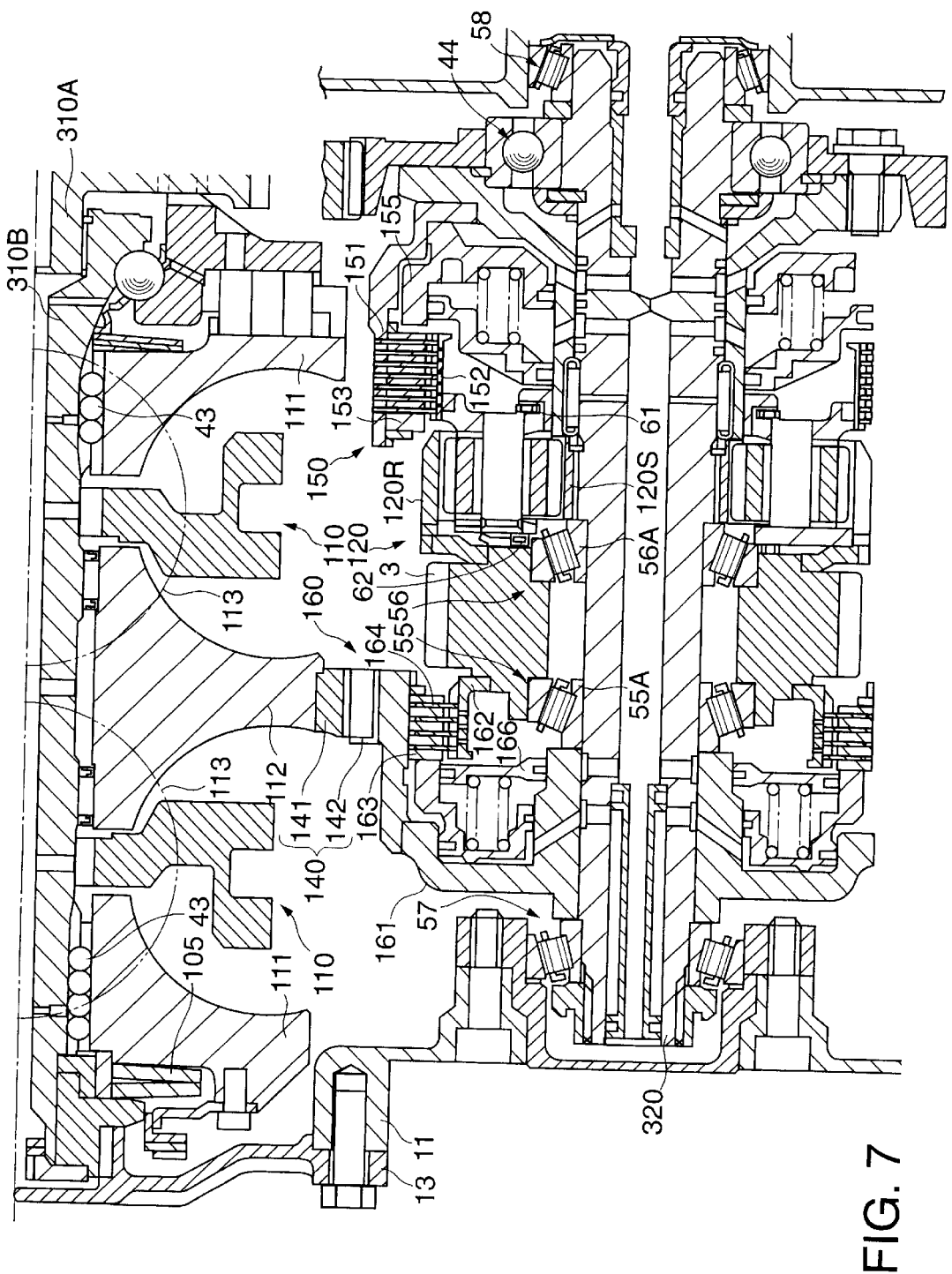
FIG. 7 is a longitudinal sectional view of the essential parts of an infinite speed ration transmission according to a fourth embodiment of this invention.

Next, a fourth embodiment of this invention will be described referring to FIG. 7.

In this embodiment, the front end of the second shaft 320 of the third embodiment is supported by the tapered roller bearing 57 instead of the roller bearing 50. On the other hand, the rear end of the second shaft 320 is supported by a tapered roller bearing 58.

An inner race 56A of the tapered roller bearing 56 is brought in contact with the sun gear 120S of the planetary gear set 120, and an inner race 55A of the tapered roller bearing 55 is brought in contact with the clutch drum 161 of the power direct clutch 160. Due to this arrangement, the length of the second shaft 320 can be minimized.

Figure 8:
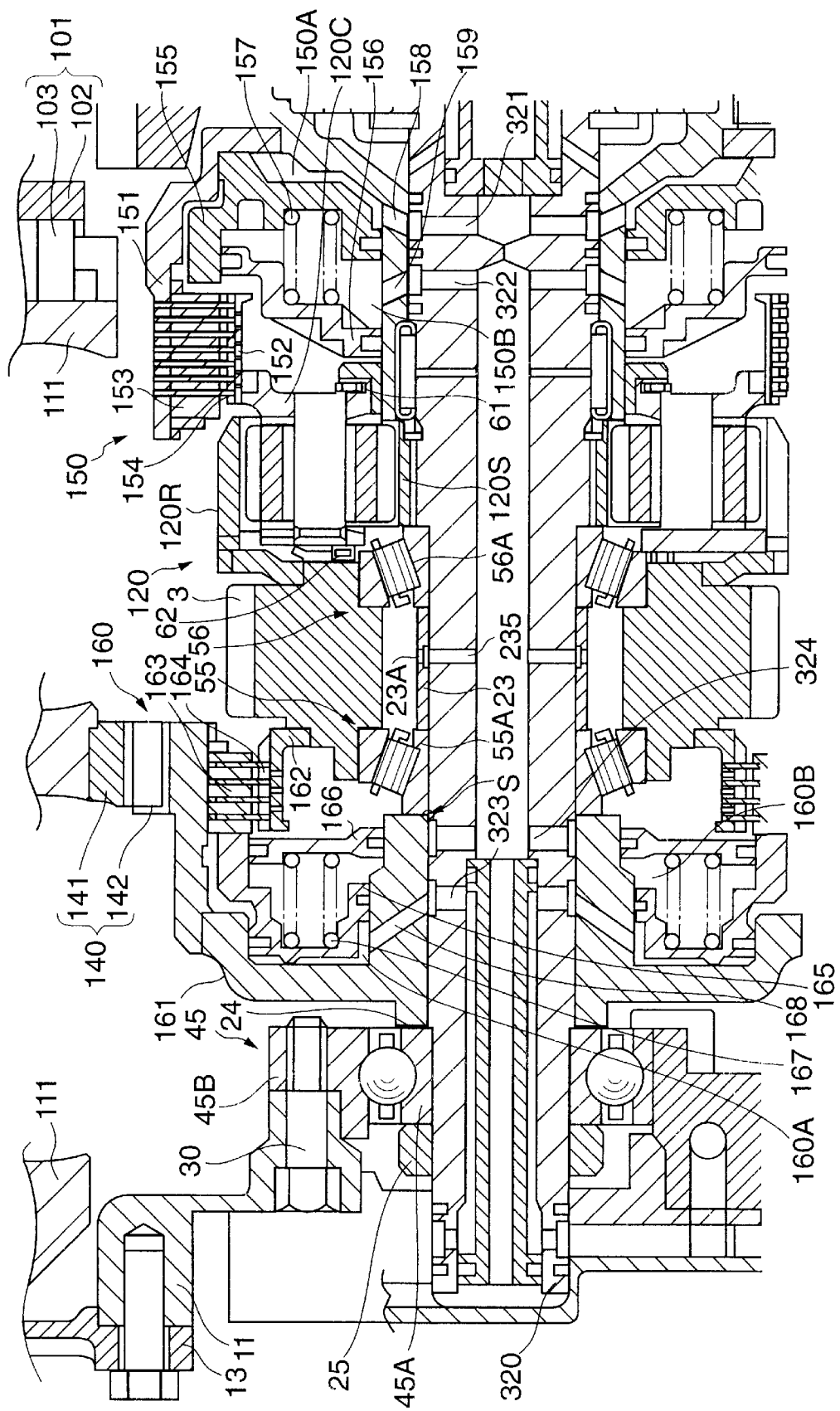
FIG. 8 is a longitudinal sectional view of the essential parts of an infinite speed ratio transmission according to a fifth embodiment of this invention.

Next, a fifth embodiment of this invention will be described referring to FIG. 8

In this embodiment, as in the aforesaid third embodiment, the final output gear 3 is supported on the second shaft 320 by the tapered roller bearings 55, 56. Also, a collar 23 for preloading the tapered roller bearings 55, 56 is interposed between the inner race 55A of the tapered roller bearing 55 and the inner race 56A of the tapered roller bearing 56.

The inner race 56A is brought in contact with the sun gear 120S, and the inner race 55A is brought in contact with the clutch drum 161 of the power direct clutch 160. Further, the clutch drum 161 comes in contact with an inner race 45A of the radial bearing 45 via a seal member 24 such as a metal gasket. A nut 25 is tightened on the second shaft 320 on the opposite side of the inner race 45A. Due to this arrangement, the inner race 45A, clutch drum 161, inner race 55A, bearing collar 23 and inner race 56A are tightened on the second shaft 320 in order without leaving any gaps on the outer periphery of the second shaft 320. An outer race 45B of the radial bearing 45 is fixed to the transmission case 10 by a bolt 30.

The tightening of the members on the second shaft 320 without leaving any gap prevents leakage of lubricating oil from the oil passage 324 which supplies low pressure fuel to the oil chamber 160B of the direct clutch 160. If there were a gap at a part S in the figure, lubricating oil leaked from this gap would wet the dry clutch plates 163, 164. According to this embodiment, however, such a leakage can be prevented without using a seal member.

An oil passage 23A is formed in the bearing collar 23. The oil passage 23A communicates with an oil passage 235 formed in the second shaft 320, and guides lubricating oil to the tapered roller bearings 55, 56 and the planetary gear set 120.

According to this embodiment, the sun gear 120S of the planetary gear set 120 is spline jointed to the second shaft 320. In this part, other joining structures can be applied as long as they allow slight axial displacement of the sun gear 120S along the second shaft 320 while restricting the relative rotation therebetween.

Figure 9:
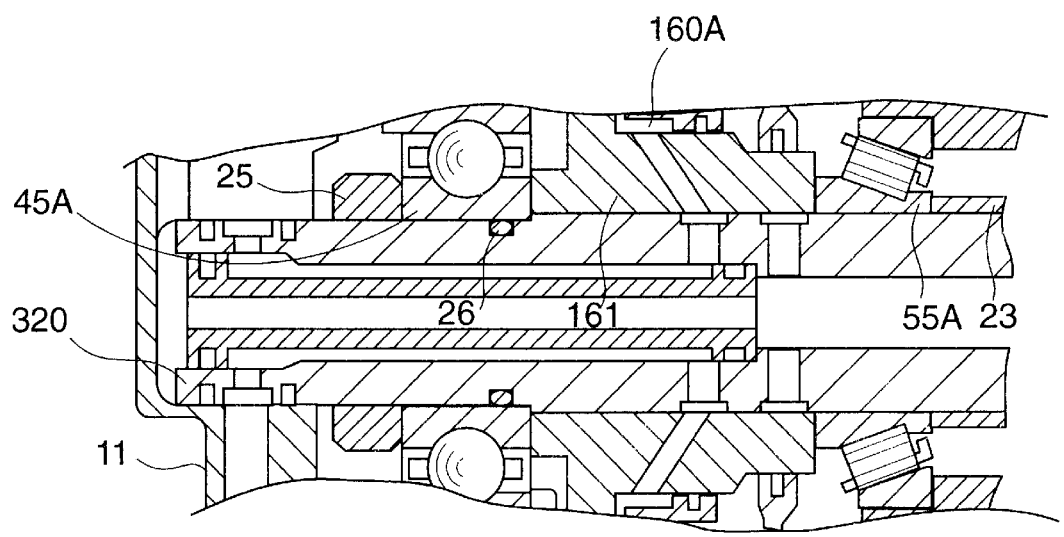
FIG. 9 is an enlarged longitudinal sectional view of the essential parts of a second shaft describing a possible variation of the fifth embodiment of this invention.
Figure 10:
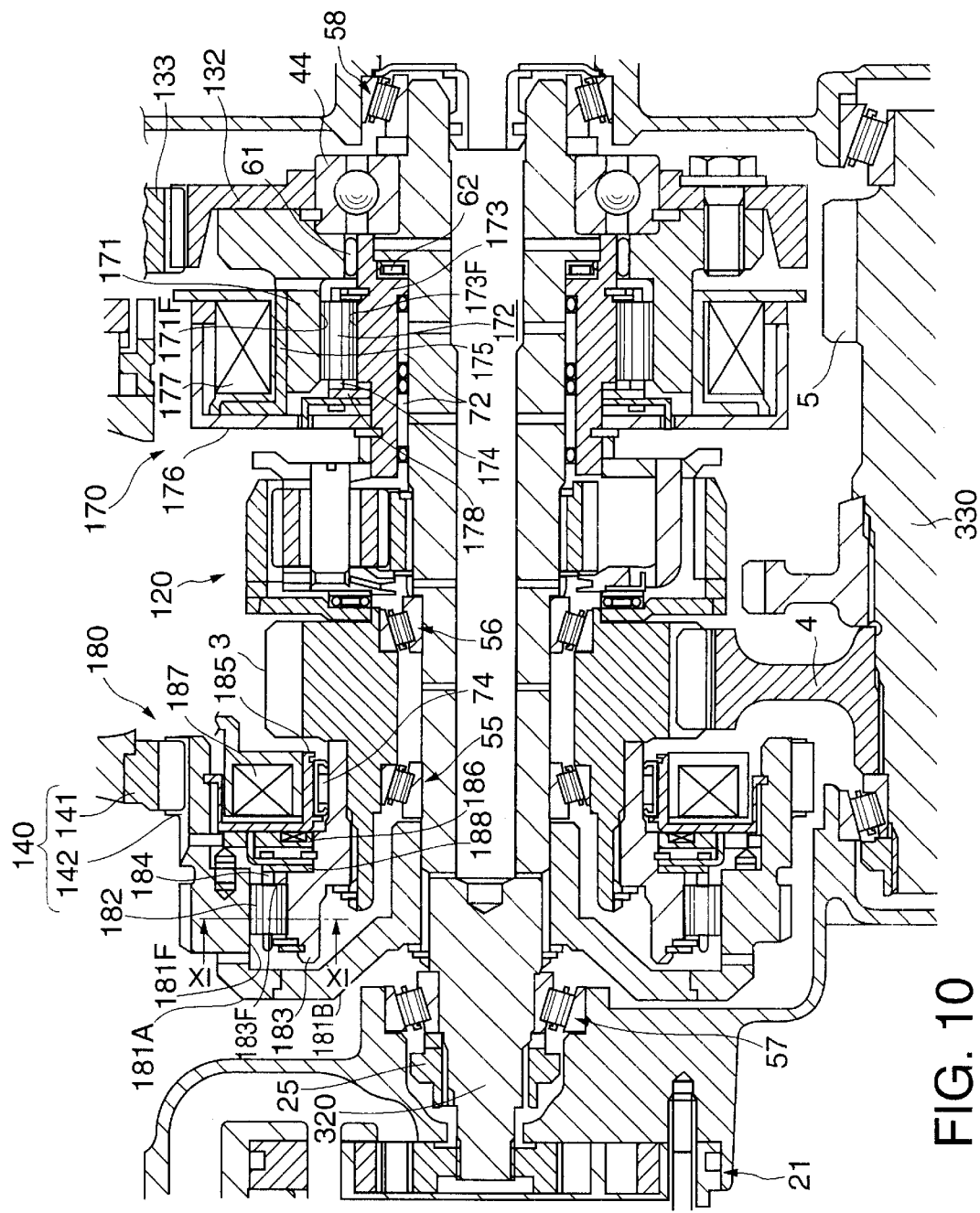
FIG. 10 is a longitudinal sectional view of the essential parts of an infinite speed ratio transmission according to a sixth embodiment of this invention.

As shown in FIG. 9, it is also desirable to fit an O-ring 126 to the outer periphery of the second shaft 320 at a position in contact with the inner race 45A of the radial bearing 45 in order to prevent leakage of high pressure oil supplied to the oil chamber 160A of the direct clutch 160.

A sixth embodiment of this invention will now be described referring to FIGS. 10, 11A, 11B, 12A, 12B, 13A and 13B.

In this embodiment, the direct clutch 160 of the fourth embodiment comprises an electromagnetic roller clutch 180, and the power recirculation clutch 150 comprises an electromagnetic roller clutch 170. Instead of disposing the oil pump 21 at the end of the rear shaft 310, it is disposed at the end of the second shaft 320, and driven by the second shaft 320.

The electromagnetic roller clutch 180 comprises a torque transmission part and an electromagnetic actuator part.

The torque transmission part comprises an input element 181, plural rollers 182, an output element 183, a retainer 184 and a spring 188.

The input element 181 is a clutch drum comprised of an outer part 181A and inner part 181B, and the gear 142 is formed in the outer N part 181A. The inner part 181B is fixed to the second shaft 320.

Figure 11A:
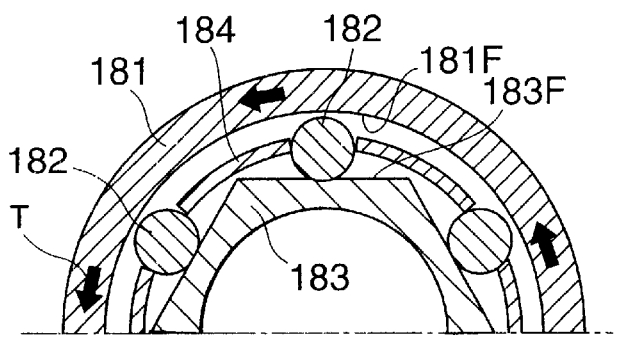
FIGS. 11A and 11B are cross-sectional views of an electromagnetic roller clutch according to the sixth embodiment of this invention taken along a line XI—XI of FIG. 10.
Figure 11B:
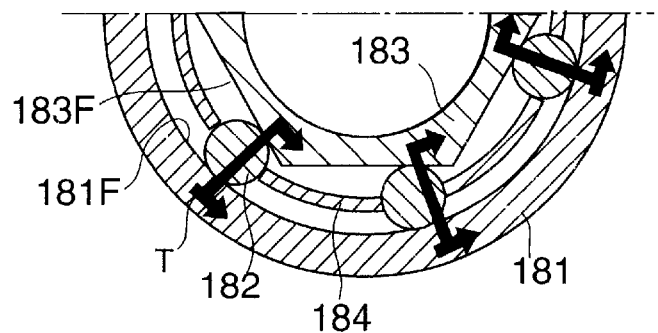

The output element 183 has a cam surface 183F of polygonal cross-section on its outer circumference as shown in FIGS. 11A and 11B, and its base end is joined to the final output gear 3. A roller 182 is disposed between the cam surface 183F of the output element 183 and the outer part 181A of the input element 183.

The roller 182 is supported in permanent contact with the cam surface 183F by a ring-shaped retainer 184. The spring 188 is interposed between the output element 183 and retainer 184, and elastically supports the retainer 184 at a predetermined rotation angle so that the roller 182 is situated in the middle of the cam surface 183F and does not come in contact with the inner circumference of the outer part 181A. When the roller 182 is in this position, the rotation of the input element 181 does not affect the output element 183, and the input element 181 rotates freely relative to the output element 183. This state corresponds to the disengaged state of the electromagnetic roller clutch 180.

The electromagnetic clutch part comprises a holder 185, armature 186 and electromagnetic coil 187. The electromagnetic coil 187 is fixed to the inside of the input element 181 by the holder 185. The holder 185 is attached free to rotate relative to the output element 183 via a needle bearing 74, and rotates together with the input element 181. The armature 186 is supported by the output element 183 together with the retainer 184 and spring 188 such that they can displace within a slight range in the axial direction of the second shaft 320.

Figure 12A:
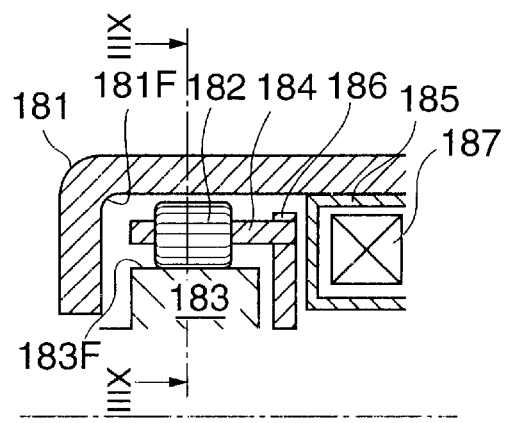
FIGS. 12A and 12B are cross-sectional views of the essential parts of the electromagnetic roller clutch.
Figure 12B:
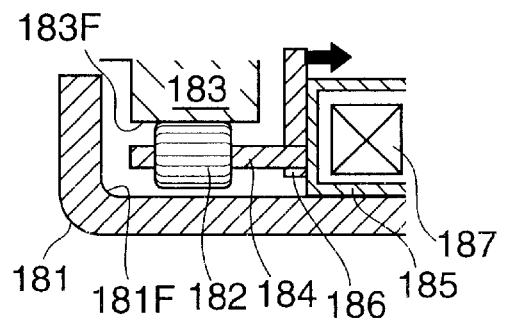
Figure 13A:
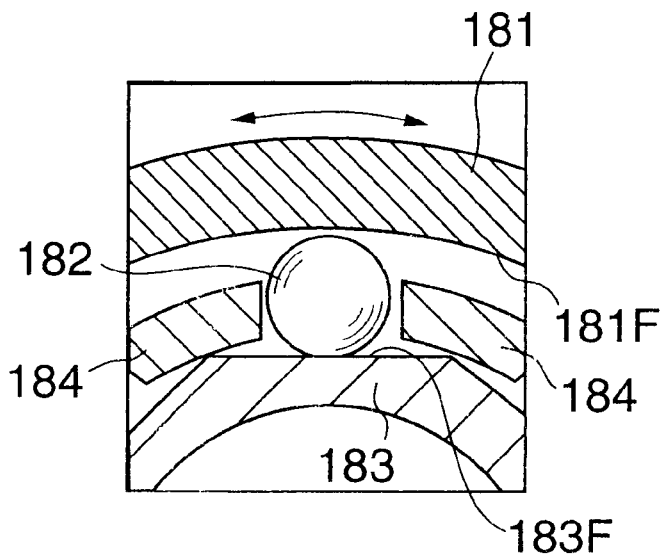
FIGS. 13A and 13B are cross-sectional views of the electromagnetic roller clutch taken along a line XIII—XIII of FIG. 12A.
Figure 13B:
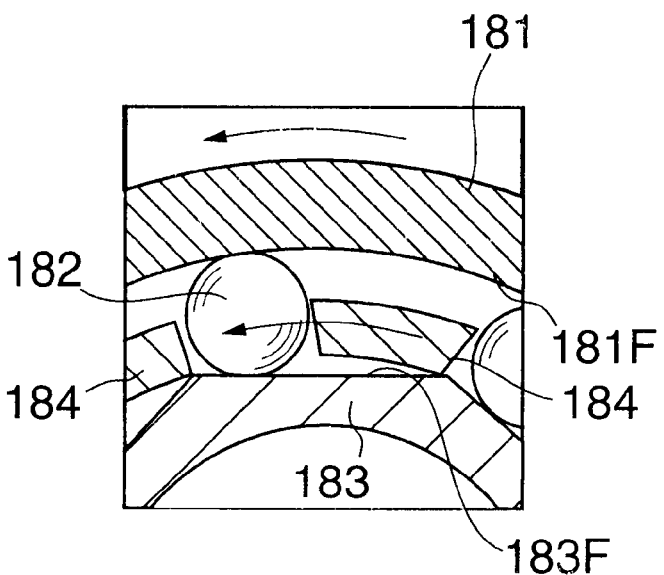

The electromagnetic coil 187 is energized according to a current supply, and attracts the armature 186 to be in contact with the holder 185. As a result, the retainer 184 tends to displace together with the input element 181 along the cam surface 183F of the output element 183 as shown in FIGS. 11A and 11B against the resilient force of the spring 188. The roller 182 then moves between the cam surface 183F and an inner circumference 181F of the outer diameter part 181A, acting like a wedge as shown in FIGS. 12B, 13B, 14B. Subsequently, the input element 181 and output element 183 rotate together even if the current supply to the electromagnetic coil 187 is stopped. This state corresponds to the engaged state of the electromagnetic roller clutch 180. To disengage the electromagnetic roller clutch 180 when it is engaged, the input element 181 and output element 183 are rotated relative to each other in opposite directions.

The electromagnetic roller clutch 170 also comprises a torque transmission part and electromagnetic actuator part in the same way as the electromagnetic roller clutch 180.

The torque transmission part comprises an input element 171, plural rollers 172, output element 173, retainer 174 and spring 178. The input element 171 is a hollow cylindrical member having one end joined to the gear 132. The output element 173 comprises a cam surface 173F of polygonal cross-section on its outer circumference, and has one end joined to the planet carrier 120C. The end of the output element 173 is formed in a cylindrical shape, the outer circumference of the end and inner circumferential surface of the input element 173 supporting each other and free to rotate relative to each other via a needle bearing 71. The inner circumferential surface of the output element 173 is supported on the second shaft 320 via needle bearings 72.

The electromagnetic actuator part comprises a holder 175, armature 176 and electromagnetic coil 177.

The electromagnetic coil 177 which is energized by supplying a current attracts the armature 176 to the holder 175, and rotates the retainer 174 against the spring 178. As a result, the roller 182 moves between the cam surface 173F of the output element 173 and an inner circumferential surface 171F of the input element 171, and the electromagnetic roller clutch 170 is placed in the engaged state. The engaged electromagnetic roller clutch 172 is disengaged by the relative rotation of the input element 171 and output element 172 in opposite directions.

The above electromagnetic clutch is known from Tokkai Hei 11-159544 published by the Japanese Patent Office in 1999.

The contents of Tokugan 2000-194536, with a filing date of Jun. 28, 2000 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, instead of applying electromagnetic clutches for both the power recirculation clutch and direct clutch, it is also possible to apply the electromagnetic clutch for one of the power recirculation clutch and direct clutch and to apply a friction clutch which is used in the first to the fifth embodiments for the other of the power recirculation clutch and direct clutch.

In all of the above embodiments, the reduction gear set 130 was disposed between the damper 2 and the toroidal CVT 100. However, this invention may be applied also to an infinite speed ratio transmission wherein it is disposed at the end of the rear shaft 310B as disclosed in Tokkai Hei 10-325459 of the aforesaid prior art. In this case, the gear 132, power recirculation clutch 150, planetary gear set 120, final output gear 3, direct clutch 160 and gear 142 on the second shaft 320 may be disposed in the opposite order from left to right to that shown in FIG. 2.

It is possible to apply a combination of a chain and sprocket, or a belt and pulley for the reduction gear set or CVT output transmission mechanism 140. It is also possible to apply such a combination instead of the combination of the final output gear 3 and idler gear 4.

The embodiments of this invention in which an exclusive property or privilege is claimed are defined as follows:

What is claimed is:

1. An infinite speed ratio transmission, comprising:
    a first shaft connected to an engine;
    a second shaft disposed in parallel with the first shaft;
    a fixed speed ratio transmission comprising a first rotating element supported free to rotate on the second shaft, the first rotating element outputting a rotation of the first shaft at a fixed speed ratio;
    a continuously variable transmission comprising a second rotating element fixed to the second shaft, the second rotating element outputting the rotation of the first shaft at an arbitrary speed ratio;
    a planetary gear set disposed between the first rotating element and the second rotating element on the second shaft, the planetary gear set comprising a sun gear joined to the second rotating element via the second shaft, a planet carrier joined to the first rotating element, and a ring gear which varies rotation direction and rotation speed according to a difference of a rotation speed of the sun gear and a rotation speed of the planet carrier;
    a final output member joined to the ring gear, the final output member being disposed between the planetary gear set and the second rotating element;
    a first clutch which can disengage and join the first rotating element and the planet carrier; and
    a second clutch which can join the second rotating element and the final output member.

2. The infinite speed ratio transmission as defined in claim 1, wherein the fixed speed ratio transmission is disposed between the engine and the continuously variable transmission.

3. The infinite speed ratio transmission as defined in claim 1, wherein the final output member is supported on the second shaft via a bearing which can support a radial load and thrust load acting on the final output member.

4. The infinite speed ratio transmission as defined in claim 3, wherein the final output member comprises a gear having plural teeth, and the bearing comprises a pair of tapered roller bearings having an effective span wider than a width of the teeth.

5. The infinite speed ratio transmission as defined in claim 1, wherein the second clutch comprises a clutch drum which rotates together with the second shaft, a clutch hub accommodated in the clutch drum and fixed to the final output gear, and a piston which brings the clutch drum to engage with the clutch hub, and the second rotating element comprises a gear fixed to an outer circumference of the clutch drum.

6. The infinite speed ratio transmission as defined in claim 5, wherein the infinite speed ratio transmission further comprises a pair of tapered roller bearings which support the final output member on an outer circumference of the second shaft, the tapered roller bearings comprising inner races which rotate together with the second shaft and supporting a radial load and a thrust load acting on the final output member, a bearing collar fitted on the outer circumference of the second shaft between the inner races, and a nut which is fitted to the second shaft to secure the inner races, the bearing collar and the clutch drum on the outer circumference of the second shaft by exerting a load in an axial direction.

7. The infinite speed ratio transmission as defined in claim 1, wherein the second shaft is different from the final output member.

* * * * *